United States Patent [19]

Giles

[11] 4,160,584
[45] Jul. 10, 1979

[54] TRANSPARENT METALLIC COATING AND A GLASS OVERCOATING ON A PLASTIC SUBSTRATE PRODUCE A CHROMATIC EFFECT

[75] Inventor: Charles L. Giles, Wilmington, Mass.

[73] Assignee: Polaroid Corporation, Cambridge, Mass.

[21] Appl. No.: 756,481

[22] Filed: Jan. 3, 1977

Related U.S. Application Data

[63] Continuation-in-part of Ser. No. 686,787, May 17, 1976, abandoned.

[51] Int. Cl.² ................ G02C 7/12; G02B 1/10; G02B 1/24
[52] U.S. Cl. .............................. 351/49; 350/164; 350/158
[58] Field of Search ............... 351/44, 49; 350/165, 350/164, 2, 1, 158

[56] References Cited

U.S. PATENT DOCUMENTS

| | | | |
|---|---|---|---|
| 2,663,171 | 12/1953 | Boone | 350/189 |
| 2,854,349 | 9/1958 | Dreyfus et al. | 350/1 UX |
| 3,516,720 | 6/1970 | Mauer | 351/44 |
| 3,549,248 | 12/1970 | Schuler | 351/49 |
| 3,914,516 | 10/1975 | Ritter | 350/311 X |

Primary Examiner—Paul A. Sacher
Assistant Examiner—Rodney B. Bovernick
Attorney, Agent, or Firm—Louis G. Xiarhos; Sheldon W. Rothstein; Stanley H. Mervis

[57] ABSTRACT

Spectacles are provided which comprise lenses having a transparent substrate upon which a continuous transparent metallic layer is vapor deposited. Coated thereover is a continuous layer of a dielectric material which is an odd multiple of one-quarter wavelength of a reference color in thickness.

7 Claims, 1 Drawing Figure

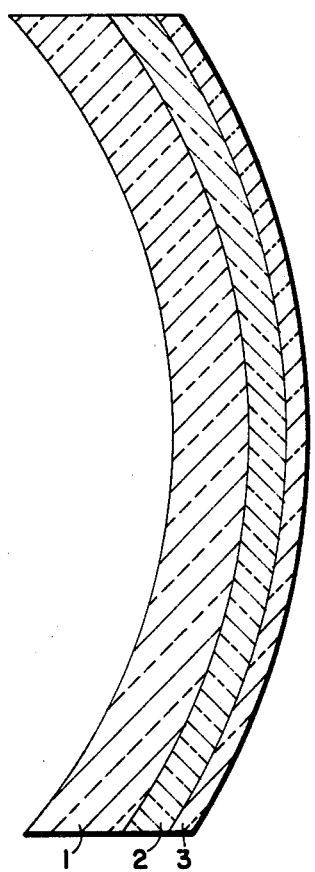

4,160,584

TRANSPARENT METALLIC COATING AND A GLASS OVERCOATING ON A PLASTIC SUBSTRATE PRODUCE A CHROMATIC EFFECT

This application is a continuation-in-part of U.S. patent application Ser. No. 686,787, filed on May 17, 1976 (now abandoned).

BACKGROUND OF THE INVENTION

The present invention is concerned with spectacles which produce a chromatic effect when viewed from the side opposed to the eyes of a wearer. The effect provided by the spectacles of this invention is primarily cosmetic, albeit in gradient density embodiments as well as continuous density embodiments the metallic layer employed will diminish the amount of light passing through thereby providing a mechanism for reducing light transmission through the lens. While the spectacle art recognizes that spectacle lenses which are designed primarily for employment in a sunglass can be made out of colored material, e.g., colored plastics, glasses, etc., the present invention provides a technique for using essentially uniformly colored or colorless materials to provide various cosmetic chromatic effects to one viewing the glasses from the side opposed to the eyes of the wearer.

OBJECT OF THE INVENTION

It is accordingly a primary object of the present invention to provide a pair of spectacles comprising lenses retained by rims which are connected by a bridge member, the spectacle lenses comprising a transparent stratum, a transparent metallic layer and a transparent layer of dielectric material overcoated on said transparent metallic layer.

A further object of the present invention is to provide a light polarizing sunglass spectacle wherein the transparent substrate described above is a light polarizing element which preferably comprises a synthetic plastic material.

Other objects, features and advantages of the invention will be obvious or will appear hereinafter.

SUMMARY OF THE INVENTION

It has been found that by employing a thin transparent layer of a dielectric material outboard of a thin transparent metallic layer which itself is outboard of a transparent stratum which will preferably comprise a light polarizing element, attractive cosmetic effects can be obtained which provide to such lenses advantages over other sunglass lenses now available in the marketplace. The "outboard" denotation is with reference to the eyes of a wearer of the spectacles of the present invention.

DESCRIPTION OF THE DRAWING

The drawing depicts a cross-sectional view of a typical spectacle lens of the present invention which comprises a thin metallic layer coated onto a transparent substrate. The metallic layer is then overcoated with a transparent dielectric material in a thickness which is an odd multiple of one-quarter wavelength of a reference color.

DETAILED DESCRIPTION OF THE INVENTION

According to the present invention, spectacles which comprise sunglass lenses which are cosmetically pleasing are produced. Such sunglass lenses are retained in rims which are fixed to one another by a bridge member which generally fits over the nose of a wearer thereby placing each rim and retained lens before a respective eye of the wearer. The spectacles of the present invention may be in a "clip-on" configuration wherein such lenses are attached to conventional spectacles or may themselves comprise an entire unit by having temples attached to each side of each rim opposed to the bridge-attachment side to enable the wearer to keep the glasses in place before his eyes by engaging the temples with his ears.

Referring to the FIGURE of the drawing, a transparent substrate 1, which is preferably a synthetic plastic material, and most preferably a synthetic plastic light polarizing element, has vacuum deposited thereover layer 2, which is a transparent metallic layer which may comprise, for example, silver, chromium, stainless steel, nickel, nichrome, etc., and essentially may comprise any reflective metallic substance which is coated in a thickness sufficiently thin so that it will be transparent to a wearer of a lens so constructed. Dielectric material layer 3 is applied by vacuum deposition in a thickness which is an odd multiple of one-quarter wavelength with respect to a reference color of the spectrum. Through about 5 orders an intensely colored reflection will be evident to a viewer. Over five orders the chromatic affect diminishes because the reflected bond widths become too narrow to be perceptible to the eye.

Since the path length travelled by a reference ray of light through the dielectric layer will change with different lens attitudes, that is, as the wearer moves his head with respect to the reference ray, varied chromatic effects will be observed since alteration of the effective path length through the dielectric material will cause changes in the colors of the light passed and reflected.

The dielectric material employed may comprise any suitable transparent dielectric substance, though silicon-containing glass materials are preferred. In particular, silicon dioxide, borosilicate glasses such as "Schott" glass, and yttrium oxide provide the outstanding chromatic characteristics which make lenses of the present invention distinctive.

If the transparent substrate 1 comprises a light polarizing element, which is the preferred embodiment of the present invention, specular glare will be eliminated by an appropriate orientation of the polarization axes. Suitable light polarizers are "H" sheet and "K" sheet, both available from Polaroid Corporation, Cambridge, Mass.

It is naturally critical that each element which comprises the lenses of the present invention be transparent. It has been found that particularly with respect to the metallic layer, the thicker the layer, that is, the closer it gets to being opaque, the less chromatic effect will be produced. Ideal chromatic effects have been found when the metallic layer is coated at about a thickness of 272 Å. Lenses which comprise a light polarizing substrate, a 272 Å thick layer of chromium, and multiples of one-quarter wavelength of silicon dioxide have been prepared and provide outstanding cosmetic effects.

The light attenuating properties of the sunglasses of the present invention are in part attributed to a dye material which comprises the substrate, and in part attributed to the reflective metallic coating. Light attenuation to provide about twelve percent transmission to the eye is considered ideal. By applying the reflective coating to the substrate in a gradient manner, that is a thicker layer of metal at the top of the lens than at the bottom, greater light transmission can be obtained at the bottom of the lens than at the top. For example, seven percent transmission can be achieved at the top, with twelve percent in the center and thirty-six percent on the bottom.

Since various substitutions and changes may be made in the above product without departing from the scope of the disclosed invention, it is intended that all matter contained in the foregoing description shall be interpreted as illustrative and not in a limiting sense.

What is claimed is:

1. A spectacle lens for spectacles comprising a pair of lens rims connected by a bridge portion for supporting right and left spectacle lenses, each of said rims retaining a spectacle lens, said spectacle lens comprising in order:
   (a) a transparent light polarizer substrate;
   (b) a transparent continuous layer of a metal coated on one surface of said substrate; and
   (c) a transparent continuous layer of a dielectric material coated over said metallic layer, the dielectric material being an odd multiple of one-quarter wavelength in thickness with respect to a reference color of the spectrum, said layer of dielectric material being positioned on the side of said lens opposed to the eye of the wearer.

2. The spectacle lens of claim 1 wherein said metal comprises an element selected from the group consisting of chromium, nickel, aluminum and silver.

3. The spectacle lens of claim 1 wherein said dielectric material comprises silicon.

4. The spectacle lens of claim 3 wherein said dielectric material comprises silicon dioxide.

5. The spectacle lens of claim 3 wherein said dielectric material comprises a borosilicate glass.

6. The spectacle lens of claim 1 wherein said dielectric material comprises yttrium oxide.

7. The spectacle lens of claim 1 wherein the thickness of said dielectric material is between one and five one-quarter wavelengths, inclusive, of a reference color of the spectrum.

* * * * *